United States Patent
Zur Loye et al.

(10) Patent No.: US 11,975,987 B2
(45) Date of Patent: May 7, 2024

(54) POLAR OXYSULFIDE FOR NONLINEAR OPTICAL APPLICATIONS

(71) Applicants: University of South Carolina, Columbia, SC (US); National Institute For Materials Science, Tsukuba (JP)

(72) Inventors: Hans-Conrad Zur Loye, Columbia, SC (US); Yoshihiro Tsujimoto, Ibaraki (JP)

(73) Assignees: University of South Carolina, Columbia, SC (US); National Institute For Materials Science, Ibaraki (JP)

(*) Notice: Subject to any disclaimer, the term of this patent is extended or adjusted under 35 U.S.C. 154(b) by 0 days.

(21) Appl. No.: 17/837,371

(22) Filed: Jun. 10, 2022

(65) Prior Publication Data

US 2022/0306484 A1 Sep. 29, 2022

Related U.S. Application Data

(63) Continuation of application No. 16/918,155, filed on Jul. 1, 2020, now Pat. No. 11,383,989, which is a continuation of application No. 16/561,190, filed on Sep. 5, 2019, now Pat. No. 10,737,948.

(60) Provisional application No. 62/727,145, filed on Sep. 5, 2018.

(51) Int. Cl.
*C01G 9/00* (2006.01)
*B01J 2/22* (2006.01)
*G02F 1/355* (2006.01)
*G02F 1/37* (2006.01)

(52) U.S. Cl.
CPC ............ *C01G 9/006* (2013.01); *B01J 2/22* (2013.01); *C01P 2002/20* (2013.01); *C01P 2002/72* (2013.01); *C01P 2002/76* (2013.01); *C01P 2002/77* (2013.01); *C01P 2002/78* (2013.01); *C01P 2006/37* (2013.01); *C01P 2006/40* (2013.01); *G02F 1/3551* (2013.01); *G02F 1/37* (2013.01)

(58) Field of Classification Search
None
See application file for complete search history.

(56) References Cited

U.S. PATENT DOCUMENTS

2015/0203398 A1* 7/2015 Meyer ............... C03C 17/3452
428/472

* cited by examiner

*Primary Examiner* — Sheng H Davis
(74) *Attorney, Agent, or Firm* — Burr Forman LLP; Douglas L. Lineberry

(57) ABSTRACT

Single crystals of a new noncentrosymmetric polar oxysulfide $SrZn_2S_2O$ (s.g. $Pmn2_1$) grown in a eutectic KF-KCl flux with unusual wurtzite-like slabs consisting of close-packed corrugated double layers of $ZnS_3O$ tetrahedra vertically separated from each other by Sr atoms and methods of making same.

11 Claims, 19 Drawing Sheets

Table 1. Results of Structural Refinement of $SrZn_2S_2O$ Using Single-Crystal XRD Data

| | |
|---|---|
| space group | $Pmn2_1$ |
| crystal system | orthorhombic |
| a (Å) | 3.87440(10) |
| b (Å) | 9.9847(3) |
| c (Å) | 6.0916(2) |
| V (Å$^3$) | 235.652(1) |
| Z | 2 |
| density (g/cm$^3$) | 4.207 |
| temperature (K) | 300(2) |
| θ range (deg) | 3.34–36.31 |
| μ (mm$^{-1}$) | 22.080 |
| crystal dimensions (mm$^3$) | 0.16 × 0.07 × 0.06 |
| collected reflections | 17928 |
| unique reflections | 1161 |
| $R_{int}$ | 0.0345 |
| GOF | 1.203 |
| $R_1(F)$ for $F_o^2 > 2\sigma(F_o^2)$ | 0.0133 |
| $R_w(F_o^2)$ | 0.0275 |
| $\Delta\rho_{max}/\Delta\rho_{min}$ (e/Å$^3$) | 1.109–0.758 |

Table 1. Results of Structural Refinement of $SrZn_2S_2O$ Using Single-Crystal XRD Data

| | |
|---|---|
| space group | $Pmn2_1$ |
| crystal system | orthorhombic |
| $a$ (Å) | 3.87440(10) |
| $b$ (Å) | 9.9847(3) |
| $c$ (Å) | 6.0916(2) |
| $V$ (Å$^3$) | 235.652(1) |
| $Z$ | 2 |
| density (g/cm$^3$) | 4.207 |
| temperature (K) | 300(2) |
| $\theta$ range (deg) | 3.34–36.31 |
| $\mu$ (mm$^{-1}$) | 22.080 |
| crystal dimensions (mm$^3$) | 0.16 × 0.07 × 0.06 |
| collected reflections | 17928 |
| unique reflections | 1161 |
| $R_{int}$ | 0.0345 |
| GOF | 1.203 |
| $R_1(F)$ for $F_o^2 > 2\sigma(F_o^2)$ | 0.0133 |
| $R_w(F_o^2)$ | 0.0275 |
| $\Delta\rho_{max}/\Delta\rho_{min}$ (e/Å$^3$) | 1.109–0.758 |

FIGURE 1

Table 2. Selected Interatomic Distances (Å) and Bond Angles (deg) of $SrZn_2S_2O$ at Room Temperature

|  | bond distance (Å) |  | bond angle (deg) |
|---|---|---|---|
| Zn(1)–O | 1.9196(17) | O–Zn(1)–S(1)×2 | 112.30(3) |
| Zn(1)–S(1)×2 | 2.3577(4) | O–Zn(1)–S(2) | 108.04(6) |
| Zn(1)–S(2) | 2.3771(7) | S(1)–Zn(1)–S(2)×2 | 106.668(17) |
|  |  | S(1)–Zn(1)–S(1) | 110.50(3) |
| Zn(2)–O | 1.9468(19) | O–Zn(2)–S(1)×2 | 105.30(4) |
| Zn(2)–S(1)×2 | 2.4017(4) | O–Zn(2)–S(2) | 114.15(6) |
| Zn(2)–S(2) | 2.3289(6) | S(1)–Zn(2)–S(2)×2 | 112.006(18) |
|  |  | S(1)–Zn(2)–S(1) | 107.53(5) |
| Sr–O×2 | 2.3985(10) | O–Sr–S(1)×2 | 83.94(4) |
| Sr–S(1) | 3.0087(8) | O–Sr–S(1)×2 | 155.09(5) |
| Sr–S(1) | 3.1102(8) | O–Sr–S(1)×2 | 109.03(5) |
| Sr–S(1)×2 | 3.0904(5) | O–Sr–S(1)×2 | 76.82(5) |
|  |  | O–Sr–O | 107.74(7) |
|  |  | S(1)–Sr–S(1) | 169.17(3) |
|  |  | S(1)–Sr–S(1)×2 | 86.659(16) |
|  |  | S(1)–Sr–S(1)×2 | 84.911(16) |

FIGURE 2

Table 3. Direction and Magnitude of the Dipole Moments (in Debye) of the Polyhedral Building Units in $SrZn_2S_2O$, $CaZnSO$, and Wurtzite ZnS

|  |  | x | y | z | magnitude |
|---|---|---|---|---|---|
| $SrZn_2S_2O$ ($Pmn2_1$) | $Zn(1)S_3O$ | 0 | −3.694 | 2.344 | 4.375 |
|  | $Zn(2)S_3O$ | 0 | 1.545 | −2.609 | 3.032 |
|  | $SrS_2O_4$ | 0 | 11.414 | −4.695 | 12.342 |
| CaZnSO ($P6_3mc$) | $ZnS_3O$ | 0 | 0 | 5.703 | 5.703 |
|  | $CaS_3O_3$ | 0 | 0 | −20.401 | 20.401 |
| wurtzite ZnS ($P6_3mc$) | $ZnS_4$ | 0 | 0 | −0.067 | 0.067 |

FIGURE 9

TABLE 4 – Atomic coordinates and equivalent isotropic displacement parameters $U_{eq}$ for $SrZn_2S_2O$ at 300 K

| atom | site | $x$ | $y$ | $z$ | $U_{eq}$ (Å$^2$×10$^2$) |
|---|---|---|---|---|---|
| Sr | 2a | 0 | 0.86500(2) | 0.81002(4) | 1.075(6) |
| Zn1 | 2a | 1/2 | 0.55761(2) | 0.80032(6) | 1.117(6) |
| Zn2 | 2a | 1/2 | 0.76066(3) | 0.38301(5) | 1.067(6) |
| S1 | 2a | 0 | 0.89390(5) | 0.3016(1) | 0.967(9) |
| S2 | 2a | 1/2 | 0.55913(5) | 0.19053(9) | 0.96(1) |
| O | 2a | 1/2 | 0.74002(16) | 0.7008(3) | 0.98(3) |

FIGURE 16

TABLE 5 - Anisotropic displacement parameters $U_{ij}$ ($10^2 \times Å^2$) for $SrZn_2S_2O$ at 300 K

| atom | $U_{11}$ | $U_{22}$ | $U_{33}$ | $U_{12}$ | $U_{13}$ | $U_{23}$ |
|---|---|---|---|---|---|---|
| Sr | 0.923(9) | 1.204(9) | 1.096(9) | 0 | 0 | -0.224(8) |
| Zn1 | 1.28(1) | 0.84(1) | 1.21(1) | 0 | 0 | 0.12(1) |
| Zn2 | 1.23(1) | 1.05(1) | 0.91(1) | 0 | 0 | -0.021(9) |
| S1 | 0.93(2) | 0.92(2) | 1.04(2) | 0 | 0 | 0.14(2) |
| S2 | 1.05(2) | 1.00(2) | 0.85(2) | 0 | 0 | -0.09(2) |
| O | 1.21(6) | 0.87(6) | 0.85(7) | 0 | 0 | 0.07(5) |

FIGURE 17

TABLE 6 - Lattice constants and atomic coordinates obtained by the first-principle calculations for $SrZn_2S_2O$

| $a = 3.90223$ Å, $b = 10.1012$ Å, and $c = 6.1417$ Å, $\alpha = \beta = \gamma = 90°$ | | | | |
|---|---|---|---|---|
| atom | site | $x$ | $y$ | $z$ |
| Sr | 2a | 1 | 0.86524 | 0.80631 |
| Zn1 | 2a | 1/2 | 0.55691 | 0.80426 |
| Zn2 | 2a | 1/2 | 0.76023 | 0.38097 |
| S1 | 2a | 0 | 0.89184 | 0.29952 |
| S2 | 2a | 1/2 | 0.55803 | 0.19347 |
| O | 2a | 1/2 | 0.74002 | 0.7018 |

FIGURE 18

TABLE 7 - Atomic coordinates and isotropic displacement parameters $B_{iso}$ refined from SXRD data collected from $SrZn_2S_2O$ at room temperature.

| atom | site | x | y | z | $B_{iso}$ (Å$^2$) |
|---|---|---|---|---|---|
| Sr | 2a | 0 | 0.8650(1) | 0.81002 | 0.79(3) |
| Zn1 | 2a | 1/2 | 0.5573(2) | 0.8052(5) | 1.10(4) |
| Zn2 | 2a | 1/2 | 0.7614(2) | 0.3824(3) | 1.22(4) |
| S1 | 2a | 0 | 0.8947(3) | 0.2947(8) | 0.40(5) |
| S2 | 2a | 1/2 | 0.5594(4) | 0.1998(5) | 0.40(5) |
| O | 2a | 1/2 | 0.7458(8) | 0.720(1) | 0.4(2) |

FIGURE 19

POLAR OXYSULFIDE FOR NONLINEAR OPTICAL APPLICATIONS

This invention was made with government support under DE-SC0008664 awarded by the Department of Energy. The government has certain rights in the invention.

BACKGROUND OF THE INVENTION

1) Field of the Invention

The present invention relates to single crystals of a new noncentrosymmetric polar oxysulfide $SrZn_2S_2O$ (s.g. $Pmn2_1$) grown in a eutectic KF-KCl flux with unusual wurtzite-like slabs consisting of close-packed corrugated double layers of $ZnS_3O$ tetrahedra vertically separated from each other by Sr atoms and methods of making same.

2) Description of Related Art

A number of physical properties, such as piezoelectricity, ferroelectricity, and second harmonic generation (SHG), only occur in materials having noncentrosymmetric (NCS) crystal structures and, as discussed by Halasyamani and Poeppelmeier, specific physical properties require the presence of specific symmetry elements in the structure in order for these properties to exist.

For example, for a material to be ferroelectric it needs to be noncentrosymmetric and polar (a subcategory of NCS structures), while for piezoelectric and SHG behaviors polar symmetry is sufficient, but not required. However, with the exception of the crystal class 432, acentricity is required. All polar structures are noncentrosymmetric, but not all NCS structures are polar. In general, both polar and NCS materials are uncommon as the vast majority of materials crystallize in centrosymmetric structures. A large number of approaches have therefore been pursued to favor the formation of NCS structures, including the synthesis of structures exhibiting second order Jahn-Teller distortions and the use of chiral ligands.

Other approaches have targeted the use of tetrahedral building blocks that can result in a polar crystal structure if all the vertices point in the same direction. This happens in a number of structural families. For example, $Ln_3MO_6$ (M=Fe and Ga and Ln=Nd, Sm, Eu, and Gd) crystallizes in the polar space group $Cmc2_1$, in which the vertices line up along the crystallographic and, therefore, polar z-direction. Another popular approach has relied on mixed anion polyhedral building blocks, such as octahedral $MF_{6-x}O_x$ and tetrahedral $MQ_{4-x}O_x$ (Q=S, Se, and Te) units containing different anions with different charges, sizes, electronegativities, and polarizabilities. In order for such materials to be polar, three conditions must be met: (1) the anions in the polyhedron must be crystallographically ordered (favored by charge and electronegativity differences); (2) the polyhedral orientation must exhibit long-range order; and (3) the polyhedral long-range structure must result in an overall net polarity.

In the case of octahedral $MF_{6-x}O_x$ units, the most common metal cations have been Ti, Nb, and Mo, with which wide band gap materials containing $MF_{6-x}O_x$ units can readily be formed under mild reaction conditions and where, depending on the value of x, different structural arrangements are possible. In the case of tetrahedral $MQ_{4-x}O_x$ units, the most common metals have been M=Zn, V, Fe, Co, Ga, Ge, and, P, where not every value of x is attainable for every element listed. Furthermore, several elements, such as Fe and Co, while present in a number of polar materials, are not appropriate for optical applications due to the fact that the presence of their d-electrons imparts color. One of the most useful elements for optical applications is $Zn^{2+}$ with a $d^{10}$ electron configuration, where for oxychalcogenides, large band gap, optically transparent, polar materials have been reported, including BaZnSO, SrZnSO, and CaZnSO. These compositions are related to several iron and cobalt oxychalcogenide phases, CaFeSO, CaCoSO, and CaFe—SeO. The symmetries and tilts of these compositions are quite varied and result in different space groups, for example, BaZnSO (Cmcm), SrZnSO ($P6_3mc$), CaFeSO ($P6_3mc$), CaZnSO ($P6_3mc$), CaFeSeO ($Cmc2_1$), and CaFeSeO (Pmcn); furthermore, multiple polymorphs can crystallize together.

One decade ago, the SHG properties of two oxysulfides, CaZnSO and $\alpha$-$Na_3PO_3S$ with highly distorted tetrahedral units, were investigated using 1064 nm radiation by Clarke and Aitken, respectively. These materials exhibited SHG efficiencies 100-200 times that of $\alpha$-quartz, but nonphase matching behaviors were observed. While phase matchability is a pivotal requisite for making SHG materials practically useful, so far, the relationship between phase matchability and crystal structure of inorganic NCS materials is not well understood.

Given the scarcity of NCS oxysulfide phases, the discovery of new oxysulfides with chemically similar local structures but different degrees or orientations of acentric building units will support the development of the chemical design of new high SHG efficient materials. Accordingly, it is an object of the present disclosure to expand this class of oxychalcogenide materials and synthesize new members of the class.

SUMMARY OF THE INVENTION

The above objectives are accomplished according to the present invention by providing in a first embodiment, a new zinc oxysulfide compound. The compound may be a noncentrosymmetric crystalline structure with chemical formula $SrZn_2S_2O$, may have lattice parameters of a=3.87440(10) Å, b=9.9847(3) Å, and c=6.0916(2) Å, and may have corrugated double layers of $ZnS_3O$ tetrahedra vertically separated by $Sr^{2+}$ ions. Further, the compound may have an O/S anion ordered arrangement provides two distinct orientations of the $ZnS_3O$ tetrahedra. Still yet, the compound may crystalize in the noncentrosymmetric polar space group $Pmn2_1$. Still yet, the O/S anion ordered arrangement may yield two distinct orientations of the Zn-centered tetrahedra. Yet further, the compound may form colorless and transparent crystals. Still again, the compound may have a band gap of 3.86 eV. Yet further, the compound may be stable up to 650° C. in $O_2$ gas atmosphere. Again still, the compound may be phase matchable with twice the SHG intensity of potassium dihydrogen phosphate (KDP). Further again, the compound may have a Sr:Zn:S molar ratio of approximately 1.0:2.0:2.3. Still yet, the compound may have a band gap energy of 3.86 eV. Still further, temperatures greater than 1000° C. may decompose the $SrZn_2S_2O$ compound.

In an alternative embodiment, a method for synthesizing the compound $SrZn_2S_2O$ is provided. The method may include employing a molten salt method using a eutectic KF-KCl mixture, loading a silver tube with 1 mmol of SrO, 1 mmol of Zn, 1 mmol of S, 3.4 mmol of KF, and 4.1 mmol of KCl, placing the silver tube in a silica tube that was evacuated to $10^{-4}$ Pa and sealed, and heating the silver tube in a tube furnace to 900° C. at 5° C./min, held for 24 h, and cooled to 600° C. at 0.17° C./min. Still further, the method may include extracting the compound from flux by dissolving the flux in water and aided by sonication.

In a still further embodiment, a method for solid state synthesis of $SrZn_2S_2O$ is provided. The method may include mixing SRO, Zn and S in a stoichiometric ratio in an agate mortar, pressing the mixture into a pellet, heating the pellet in an evacuated silica tube at 1000° C. for 24 hours, and sonicating at 1000° C. with water.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 shows Table 1—Results of Structural Refinement of $SrZn_2S_2O$ Using Single-Crystal XRD Data.

FIG. 2 shows Table 2—Selected Interatomic Distances (A) and Bond Angles (deg) of $SrZn_2S_2O$ at Room Temperature.

FIG. 9 shows Table 3—Direction and Magnitude of the Dipole Moments (in Debye) of the Polyhedral Building Units in $SrZn_2S_2O$, CaZnSO, and Wurtzite ZnS.

FIG. 16 shows Table 4—Atomic coordinates and equivalent isotropic displacement parameters Ueq for $SrZn_2S_2O$ at 300 K.

FIG. 17 shows Table 5—Anisotropic displacement parameters $U_{ij}$ ($10^2 \times Å^2$) for $SrZn_2S_2O$ at 300 K.

FIG. 18 shows Table 6—Lattice constants and atomic coordinates obtained by the first principle calculations for $SrZn_2S_2O$ FIG. 19 shows Table 7—Atomic coordinates and isotropic displacement parameters Biso refined from SXRD data collected from $SrZn_2S_2O$ at room temperature.

Figure 3:
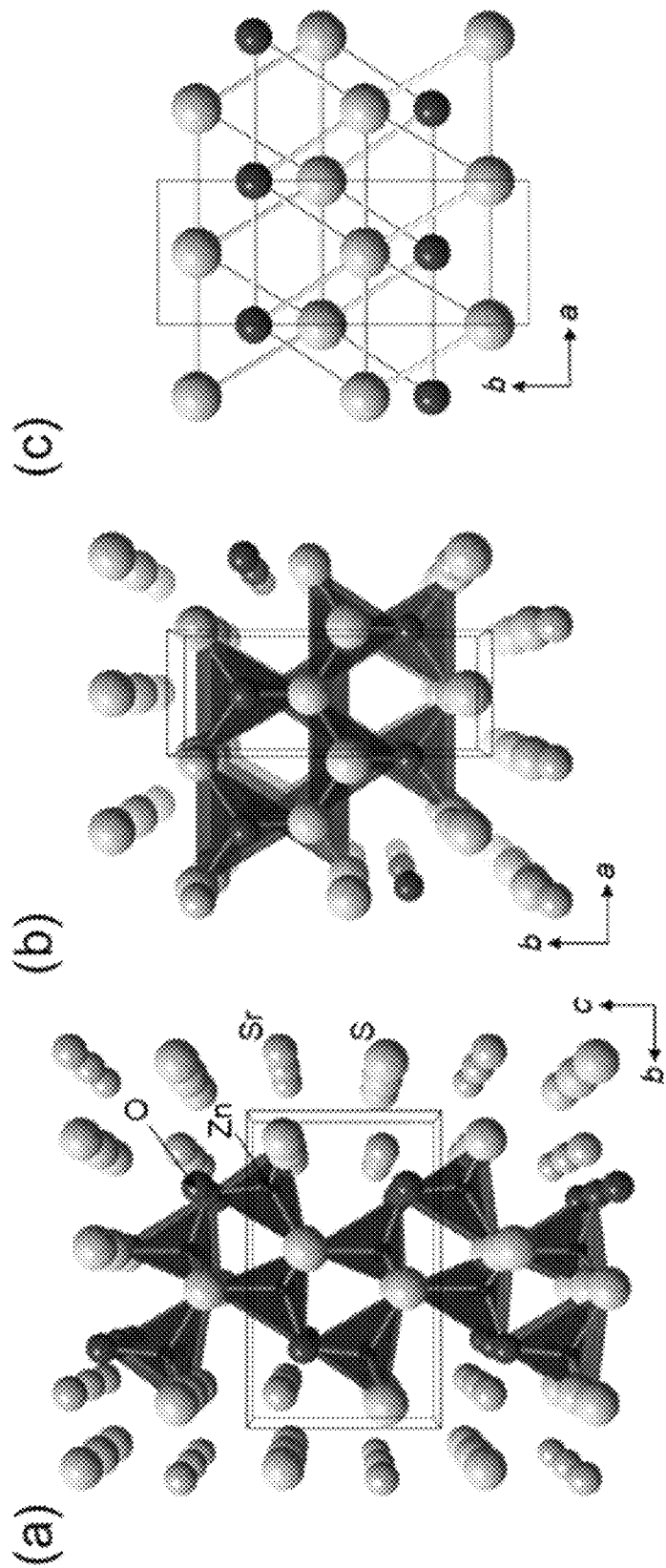
FIG. 3 shows at (a, b) a perspective view of the $SrZn_2S_2O$ crystal structure along the a and c axes and at (c) O/S anion-ordered arrangement in the close-packed layers of $ZnS_3O$ tetrahedra.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure focused on the Sr—Zn—S—O system and synthesized the new composition, $SrZn_2S_2O$, crystallizing in the polar space group $Pmn2_1$. $SrZn_2S_2O$ is compositionally, but not structurally, related to $SrFe_2S_2O$ and $SrFe_2Se_2O$, which crystallize in the centrosymmetric space group Pmmn. The current disclosure provides the synthesis, crystal structure, and SHG behavior of this new polar oxysulfide material.

Single crystals of a new zinc oxysulfide $SrZn_2S_2O$ were grown in a eutectic KF-KCl flux, and the structure was determined by single-crystal X-ray diffraction. $SrZn_2S_2O$ crystallizes in the noncentrosymmetric polar space group $Pmn2_1$ with lattice parameters of a=3.87440(10) Å, b=9.9847(3) Å, and c=6.0916(2) Å. In the crystal structure, close-packed corrugated double layers of $ZnS_3O$ tetrahedra, which are derived from the wurtzite structure, are vertically separated by $Sr^{2+}$ ions. In addition, the O/S anion ordered arrangement in each close-packed layer yields two distinct orientations of the Zn-centered tetrahedra. The crystals of $SrZn_2S_2O$ are colorless and transparent, and the oxysulfide has a band gap of 3.86 eV, based on UV-vis-NIR diffuse reflectance measurements. Thermogravimetric measurements showed that $SrZn_2S_2O$ is stable up to 650° C. in $O_2$ gas atmosphere. First-principle calculations indicate that the valence band maximum is mainly composed of O-2p and S-3p states, whereas the conduction band minimum is derived from Zn-4s, Zn-4p, and Sr-4d states. The calculated band dispersion reveals a direct band gap corresponding to a transition between S-3p and Zn-4s energy levels. Second harmonic generation (SHG) measurements determined that $SrZn_2S_2O$ is phase matchable with twice the SHG intensity of potassium dihydrogen phosphate (KDP) in contrast to CaZnSO with similar $ZnS_3O$ building units, which exhibits non-phase matching behavior.

Experimental Section

Reagents. Zn (Alpha Aesar, 99.9%) and S (Fisher, 99.99%) in powder form were used as received. SrO was prepared by heating $SrCO_3$ in air at 1050° C. overnight. KF (Alpha Aesar, 99.9%) and KCl (Alpha Aesar, 99.9%) were dried at 260° C. prior to use.

Figure 10:
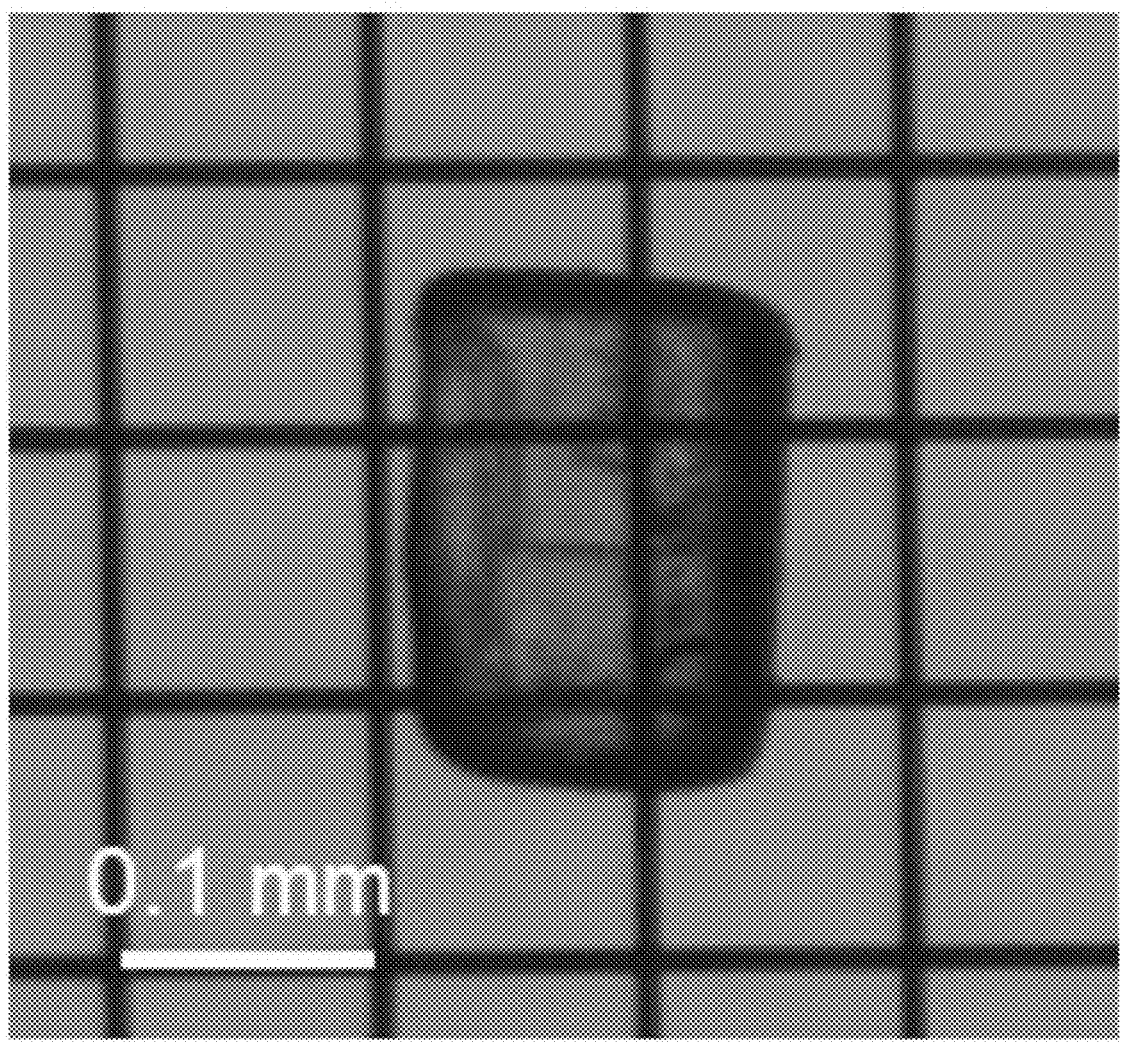
FIG. 10 shows a photograph of a colorless transparent single crystal of $SrZn_2S_2O$.

Crystal Growth. Single crystals of $SrZn_2S_2O$ were obtained by a molten salt method using a eutectic KF-KCl mixture. A silver tube welded closed on one end was loaded with 1 mmol of SrO, 1 mmol of Zn, 1 mmol of S, 3.4 mmol of KF, and 4.1 mmol of KCl. The top of the tube was crimped, and the tube was placed inside a silica tube that was evacuated to $10^{-4}$ Pa and sealed. The starting materials were heated in a tube furnace to 900° C. at 5° C./min, held for 24 h, and cooled to 600° C. at 0.17° C./min at which point the furnace was turned off and allowed to cool to room temperature. The product was extracted from the flux by dissolving the flux in water, aided by sonication. Colorless transparent plate-like crystals of $SrZn_2S_2O$ (typical dimension 0.1×0.2×0.05 mm$^3$, see FIG. 10) were isolated via vacuum filtration. Semiquantitative analyses by energy-dispersive X-ray analysis (EDS) indicated a Sr:Zn:S molar ratio of approximately 1.0:2.0:2.3. The structure of $SrZn_2S_2O$ was solved by single crystal X-ray diffraction.

Figure 11:
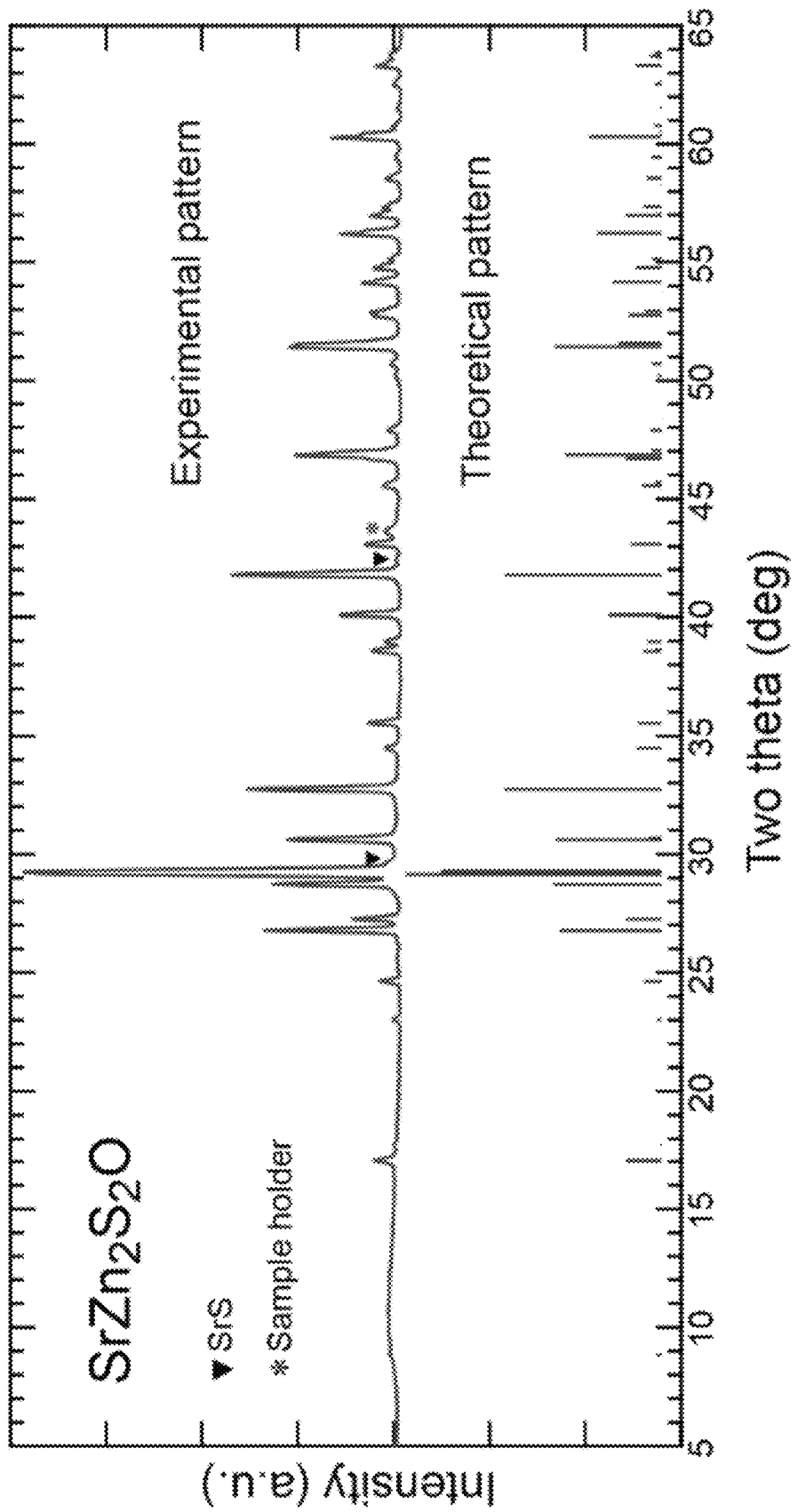
FIG. 11 shows a comparison of the powder XRD pattern of purified $SrZn_2S_2O$ with a theoretical pattern based on the single-crystal XRD analysis.
Figure 12:
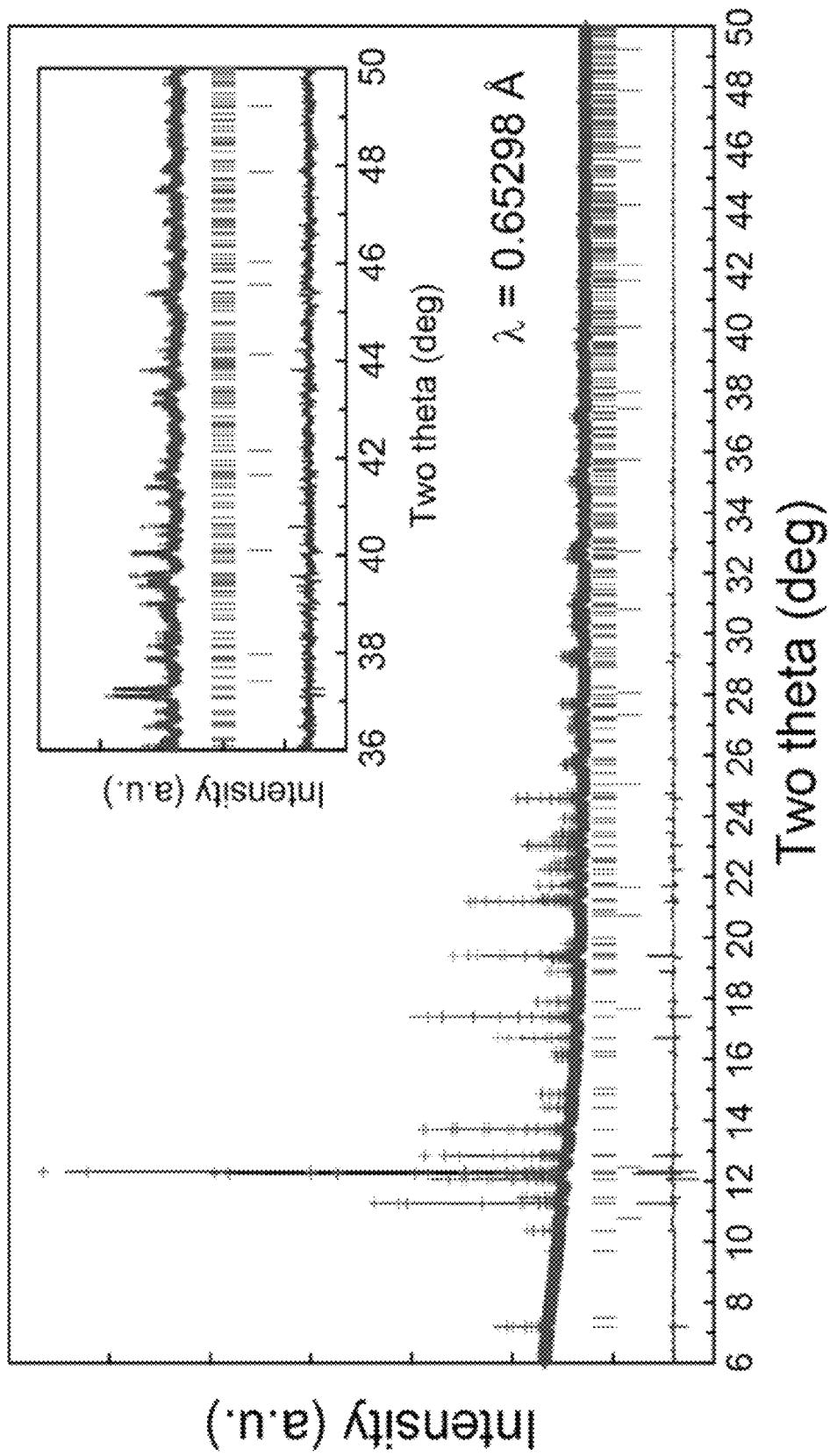
FIG. 12 shows SXRD patterns for purified $SrZn_2S_2O$ measured at room temperature.

Solid-State Synthesis. Polycrystalline powder samples of $SrZn_2S_2O$ were synthesized using SrO, Zn, and S in a stoichiometric ratio. The starting materials were thoroughly mixed in an agate mortar, pressed into a pellet, and heated in an evacuated silica tube at 1000° C. for 24 h. Powder XRD measurement using a Bruker D2 Phaser equipped with an LYNXEYE silicon strip detector and a Cu Kα source identified $SrZn_2S_2O$ as the main phase and SrS as a minor phase. Additional heat treatment under the same condition did not improve the relative amount of $SrZn_2S_2O$ to SrS. Heating at higher temperatures (>1000° C.) decomposed $SrZn_2S_2O$. A pure sample was obtained by sonicating the product prepared at 1000° C. with water in which SrS readily decomposes and the remaining $SrZn_2S_2O$ was isolated by vacuum filtration. The powder XRD data of $SrZn_2S_2O$ after removal of SrS is shown in FIG. 11. A Rietveld refinement of the synchrotron powder XRD data of $SrZn_2S_2O$ after removal of SrS is shown in FIG. 12, and the atomic coordinates and atomic displacement parameters are listed in FIG. 19, which shows Table 7—Atomic coordinates and isotropic displacement parameters Biso refined from SXRD data collected from $SrZn_2S_2O$ at room temperature. The space group is $Pmn2_1$ (No. 31) with a=3.87466(1) Å, b=9.98582 Å, and c=6.09207 Å. R indices are Rwp=2.44%, Rp=1.65%, RB=7.129%, and RF=5.47%. Site occupancy for each atom was fixed to unity. The Biso parameters for S1 and S2 were constrained to the same value during refinements. The c coordinate of Sr atom (the heaviest element) along the polar axis was fixed to those obtained by the single-crystal structure analysis.

Single Crystal Structure Determination. X-ray intensity data were collected from a clear colorless crystal using a Bruker D8 QUEST diffractometer. The D8 utilizes an Incoatec microfocus source (Mo Kα radiation, λ=0.71073 Å) and a Photon II CMOS area detector. The detector was operated in the shutterless mode, and fast scans with 1 s exposure times were used to quantify peaks that were too intense for the detector to measure during the full data collection. Data collection covered 98.8% of reciprocal space up to $\theta_{max}$=36.308°, with an average redundancy of 15. The raw area detector frames were reduced and corrected for Lorentz, polarization, and absorption effects using the SAINT+ and SADABS programs. Initial structural models and subsequent least-squares refinements were performed with the SHELX package, through the OLEX$^2$ GUI.

The title compound crystallizes in the NCS orthorhombic space group $Pmn2_1$ with lattice parameters a=3.87440(10) Å, b=9.9847(3) Å, and c=6.0916(2) Å. The asymmetric unit contains one Sr site, two Zn sites, two S sites, and one O site, all of which lie on Wyckoff site 2a with mirror symmetry. Each site was individually allowed to freely refine, and there were no significant deviations from unity. PLATON modules TwinRotMat and Addsym were used to check for minor twin components and missed symmetry elements. The twin law (−1 0 0 0 −1 0 0 0 −1) with volume fraction 0.032(6) was implemented, and the model was refined as a two-component inversion twin. No missed symmetry elements were found, confirming the NCS space group. The final refinement based on the model resulted in an excellent $R_1$ value of 0.0133 and the small maximum, and minimum residual electron densities of 1.109 and −0.758 indicate an excellent fit of the model to the data.

Powder XRD, TGA, and UV-Vis. Powder X-ray diffraction (PXRD) patterns were collected at room temperature using a Bruker D2 Phaser instrument. Patterns were collected in the 5-65° 2θ angular range with a step size of 0.02°. Thermogravimetric analysis (TGA) was performed using a PerkinElmer Pyris 1 TGA system under $O_2$ gas flow (60 mL/min). The sample was loaded in an alumina crucible and heated to 1000° C. at 10° C./min. The thermal products were analyzed by PXRD. UV-vis-NIR absorption measurements on $SrZn_2S_2O$ were carried out using a Shimazu UV2600 UV-vis-NIR spectrometer (used in the diffuse reflectance mode) equipped with an integrating sphere. Deuterium and halogen lamps were used as sources of UV and visible-NIR light, respectively. Spectra were recorded over the range of 220-1200 nm. The diffuse reflectance data were converted to absorbance internally by the instrument by use of the Kubelka-Munk function.

SHG Measurements. The powder SHG measurements were carried out with the Kurtz-Perry method using a pulsed Nd:YAG Quantel Ultra laser (Model: Ultra 50) with a wavelength of 1064 nm. $KH_2PO_4$ (KDP) was used as a benchmark material. $SrZn_2S_2O$ and KDP were ground and sieved into distinct particle size ranges (<20, 20-45, 45-63, 63-75, 75-90, 90-125 µm). The intensities of the frequency-doubled output emitted from the sieved samples were detected using a photomultiplier tube and recorded on the Tektronix oscilloscope (Model: TDS3032).

Density Functional Theory (DFT) Calculations. First-principles DFT calculations were performed for $SrZn_2S_2O$ using the Vienna Ab Initio Simulation Package. The Perdew-Burke-Ernzerchof generalized gradient approximation (GGA) was employed for the exchange and correlation function. Projector augmented-wave potentials were used for Sr, Zn, S, and O atoms. The cell parameters and atomic positions were optimized until the maximum force on each atom was less than 0.02 eV/A, based on the experimentally determined crystal structure. Then, a single point calculation was carried out to calculate a band structure and density of states. Plane wave basis sets with a cutoff of 500 and 520 eV were used for the optimization and single point calculations, respectively. In both calculations, the self-consistent field tolerance was $1.0 \times 10^{-7}$ eV/atom and the k-point mesh was 9×5×7. The crystal orbital Hamilton population (COHP) analysis was performed using the LOBSTER code.

Results and Discussion

The single-crystal structure solution established that $SrZn_2S_2O$ crystallizes in the NCS polar space group of $Pmn2_1$ (No. 31). The details of the structural refinement are listed in Table 1, selected interatomic distances and angles are compiled in Table 2, and atomic coordinates and atomic displacement parameters are listed in Tables 4 and 5.

$SrZn_2S_2O$ crystallizes in a unique two-dimensional structure, shown in FIG. 3, in which wurtzite-like slabs, consisting of close-packed corrugated double layers of $ZnS_3O$ tetrahedra, are located in the ac plane. The slabs are separated from each other vertically by $Sr^{2+}$ ions positioned parallel to the ac plane. The $O^{2-}$ and $S^{2-}$ ions, both of which occupy two inequivalent crystallographic positions, are crystallographically ordered and located in each layer such that the oxide ions are connected to both electropositive $Sr^{2+}$ and electropositive $Zn^{2+}$ ions. Furthermore, the $ZnS^3O$ tetrahedra have two distinct orientations in the ab plane and are connected by a common shared sulfur apex that creates the corrugation. This type of layered structure is substantially different from other wurtziterelated intergrowth structures, where the corner-shared tetrahedra form single layers of $MS_3O$ (M=Fe, Co, Zn) tetrahedra in which all tetrahedra have the same orientation.

Figure 4:
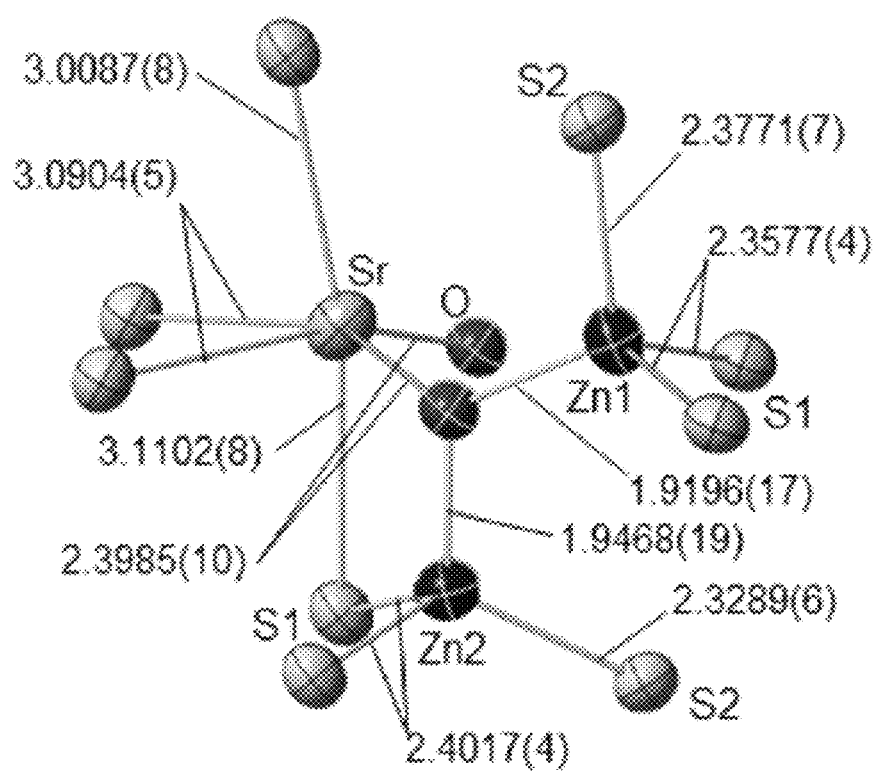
FIG. 4 shows the local coordination environment around Sr and Zn atoms.

The heteroleptic zinc coordination environment creates the asymmetric tetrahedral coordination, as illustrated in FIG. 4. The Zn(1)-O and Zn(2)-O bond distances of 1.9196 (17) Å and 1.9468(19) Å, respectively, are somewhat longer than the Zn—O bond distances in CaZnSO (1.8997(5) Å) and SrZnSO (1.9000(7) Å) having similar Zn-centered coordination, but are shorter by 2-3% than the average Zn—O bond distance of 1.979 Å in wurtzite ZnO. The Zn(1)-S(2) and Zn(2)-S(1) bond distances are similar to the Zn—S bond distances found in CaZnSO (2.3718(5) Å) and SrZnSO (2.4173(9) Å) and are longer by 1.4 and 2.5%, respectively, than the average Zn—S bond distance of 2.343 Å in wurtzite ZnS. The Zn(1)-S(1) and Zn(2)-S(2) bond distances are within 1% of the distances observed in wurtzite. The bond angles of O—Zn—S and S—Zn—S are within ±4% of the ideal value(109.5°) for a regular tetrahedron. The $Sr^{2+}$ ions are found in a distorted octahedral coordination environment consisting of two oxide ions at 2.3985(10) Å and four sulfide ions at 3.0087(8)-3.1102(8) Å, yielding a second asymmetric unit in the structure. The bond-valence-sum (BVS) calculations resulted in 2.02 for Sr, 1.99 for Zn(1), and 1.90 for Zn(2), which are in good agreement with the expected oxidation states.

The long-range order and coexistence of mixed anions in the same layer in $SrZn_2S_2O$ are quite unique because, typically, oxygen and the other chalcogens tend to be separated in different layers. Recently, similar anion order in a different framework was reported for the iron-based oxychalcogenides, $AFe_2Q_2O$ (A=Sr, Ba; Q=S, Se) and CaFeSeO. In the structure of $AFe_2Q_2O$ two infinite chains of $FeQ_3O$ tetrahedra share oxygen apexes to create double chains, which in turn are connected by sharing three sulfur atoms with another double chain, resulting in layers. These close packed layers are stacked parallel with $A^{2+}$ layers perpendicular to the hexagonal c-axis, unlike $SrZn_2S_2O$, where the layers are parallel to the hexagonal c-axis. Another example is CaFeSeO, crystallizing in the space group $Cmc2_1$ which can be considered to be a member of a homologous series (AO)(MQ)n (M=Fe, Zn; n=1, 2) to which CaFeSeO and $SrZn_2S_2O$ belong. CaFeSeO contains puckered sheets consisting of $FeSe_2O_2$ tetrahedra located in the ac plane that are also vertically separated by $Ca^{2+}$ layers oriented parallel to the hexagonal c axis, see FIG. 14. A major reason for the structural difference between $SrZn_2S_2O$ and $SrFe_2S_2O$ may be the electronic configuration of these d transition metal cations. While the $Zn^{2+}$ ion has the closed-shell (spherical) $d^{10}$ electronic configuration, tetrahedrally coordinated $Fe^{2+}$ ion possesses a doubly occupied $e_g$ orbital, which favors a more distorted coordination geometry. A distortion index (D) defined by Baur is useful for evaluating the magnitude of distortion in polyhedra. D is calculated using bond lengths in a polyhedron, using equation 1, below:

$$D = \frac{1}{4}\sum_{1}^{4}\left(\frac{|l_i - l_{av}|}{l_{av}}\right) \quad (1)$$

where $l_i$ is the length between the metal center and the ith surrounding atom, and $l_{av}$ is the average bond length. A larger D value indicates a higher magnitude of polyhedral distortion. The D value of the $FeS_3O$ tetrahedra in $SrFe_2S_2O$ is 0.08474, much larger than the 0.07400 and 0.07115 for the $Zn(1)S_3O$ and $Zn(2)S_3O$ tetrahedra, respectively, in $SrZn_2S_2O$. This is consistent with the difference in electronic configuration between $Zn^{2+}$ and $Fe^{2+}$. Note that CaFeSO and CaZnSO adopt similar crystal structures despite the large difference between their D values (0.08609 for $FeS_3O$ and 0.07845 for $ZnS_3O$). This suggests that the difference in the anion ordered arrangement should be another important factor for maintaining the same crystal symmetry.

Figure 5:
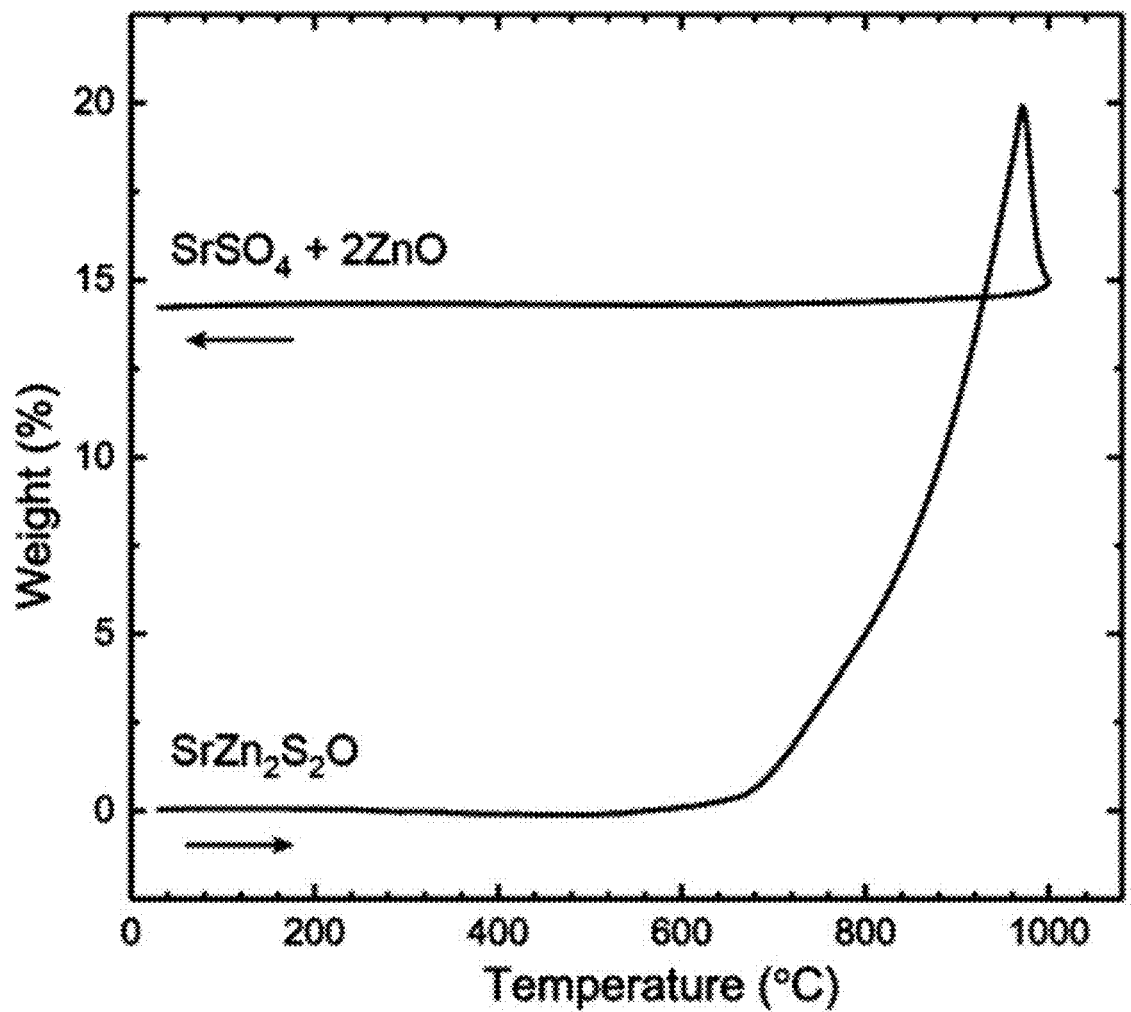
FIG. 5 shows a thermogravimetric curve of $SrZn_2S_2O$ in $O_2$ gas atmosphere.

The thermogravimetric (TG) analysis of $SrZn_2S_2O$, shown in FIG. 5, demonstrates a high thermal stability in air, up to 650° C. An irreversible weight increase is observed once the temperature exceeds 650° C. and continues to 1000° C. The TG curve shows a weight gain starting at 650° C. that reaches a maximum value at 970° C. and then decreases on further heating up to 1000° C. The net weight gain is 14.2%. Based on a powder the X-ray diffraction analysis of the products, FIG. 13, the net gain results from the decomposition of $SrZn_2S_2O$ into ZnO and $SrSO_4$. The calculated weight gain is 16.1%, which is consistent with the experimental value.

Figure 6:
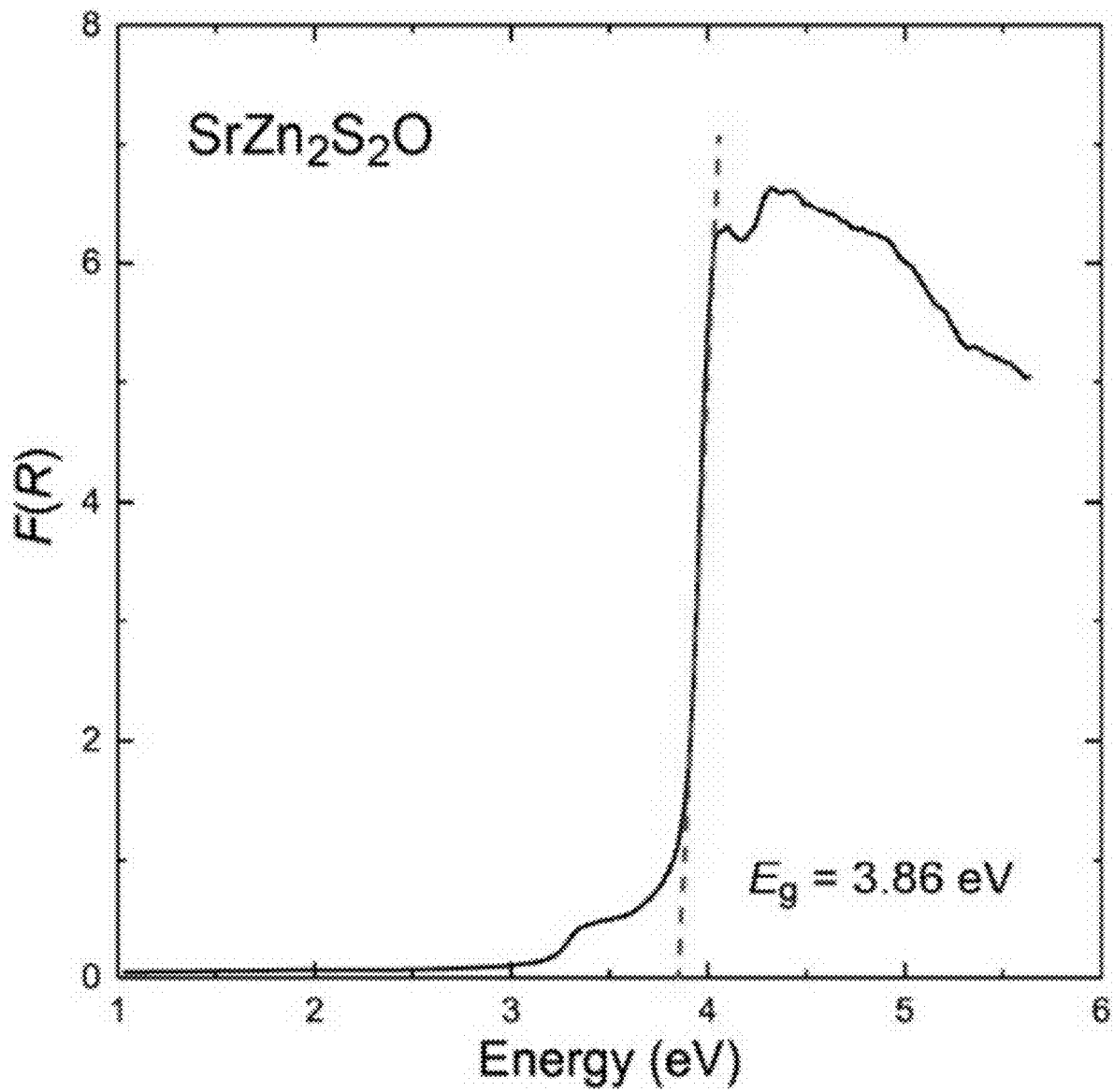
FIG. 6 shows the UV-vis-NIR optical absorption spectrum of $SrZn_2S_2O$.

The UV-vis-NIR absorption spectrum of $SrZn_2S_2O$ powder is shown in FIG. 6. The absorption curve exhibits a steep increase close to 4 eV, and an extrapolation of the linear portion of the absorption plot to the x-axis indicates a band gap of $E_g$=3.86 eV. The large band gap is consistent with the clear, colorless crystals grown out of the flux. The weak absorption noticeable between 3 and 3.8 eV is likely due to impurity states. The 3.86 eV band gap of $SrZn_2S_2O$ is significantly larger than the 3.3 eV band gap of $ZnO_4$ as well as the 3.1 eV band gap of SrZnSO and is comparable with those found in zinc-based sulfides and oxysulfides, such as ZnS (3.8 eV), CaZnSO (3.7 eV), and BaZnSO (3.9 eV).

Figure 7:
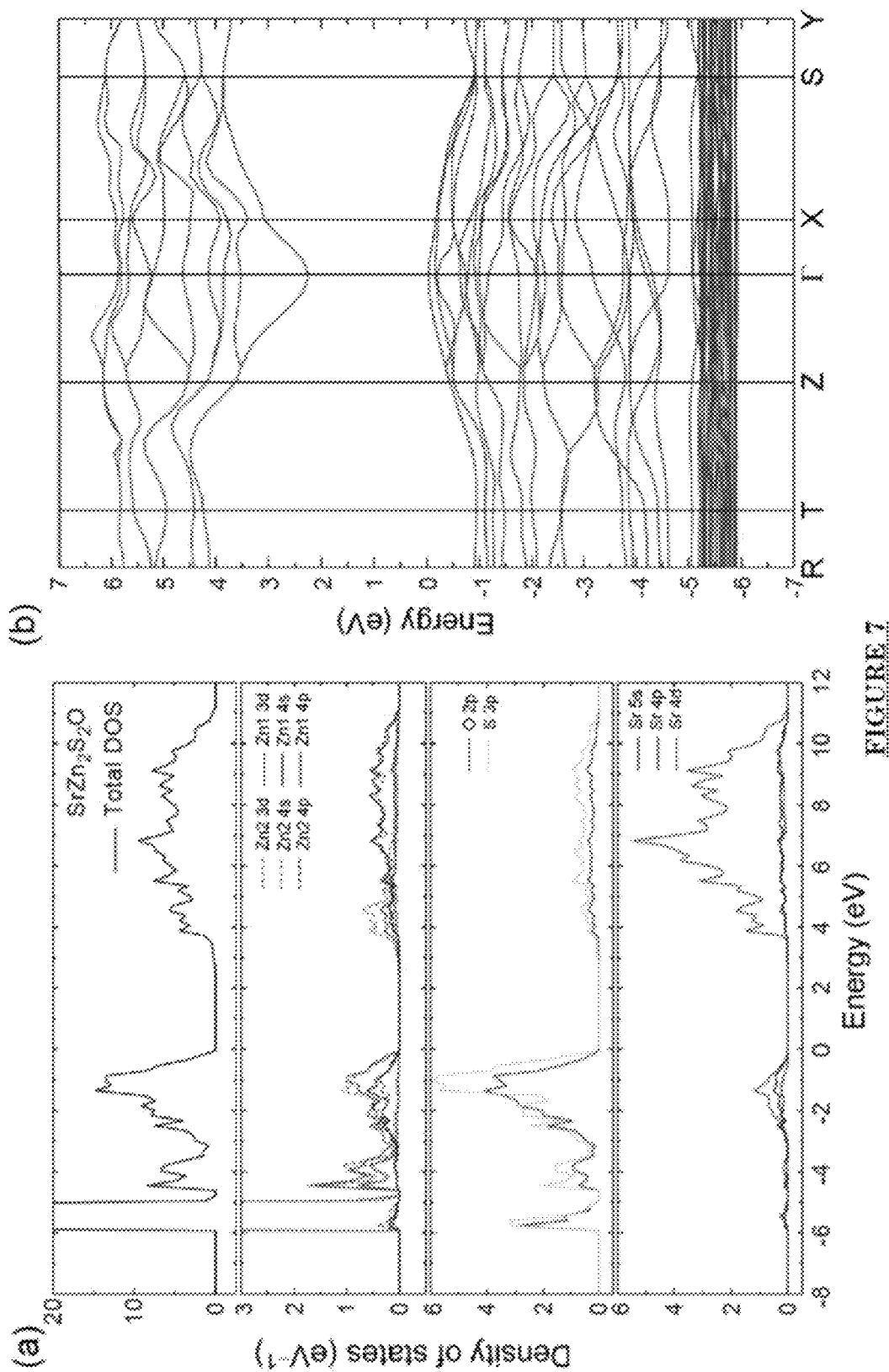
FIG. 7 shows at (a) total and partial density of states and at (b) band dispersions of $SrZn_2S_2O$.

FIG. 7 shows the total and partial DOS and the band dispersion of $SrZn_2S_2O$, which are qualitatively similar to those of (Ca/Sr)ZnSO with similar local coordination environments around the metal cations. The computationally optimized lattice constants and atomic coordinates are consistent with those determined by the single-crystal XRD analysis, see Table 6. The band dispersion reveals that $SrZn_2S_2O$ is a direct band gap semiconductor with the band gap energy of 2.26 eV at the $\Gamma$ point. Underestimation of the band gap energy is typical of DFT calculations. The valence band maximum is mainly composed of the O-2p and S-3p states. The S-3p band is located at a higher energy level than the O-2p band, as observed in the other oxysulfide compounds. The partial DOS plots indicate the strong hybridization between Zn-3d/Zn-4s/Zn-4p or Sr-4d/Sr-5s/Sr-5p and O-2p/S-3p states in the valence band ranging from −6 eV to the Fermi energy level, resulting in the (Zn-3d/Zn-4s/Zn-4p)-(O-2p/S-3p) bonding states and the (Zn-3d)-(O-2p/S-3p) antibonding state, see FIG. 15. The conduction band maximum is composed of Zn-4s and the Zn-4p and Sr-4d states that reside at higher energy regions. These states form antibonding states with O-2p/S-3p. Based on these results, the direct band gap corresponds to a transition between S-3p and Zn-4s energy levels.

Figure 8:
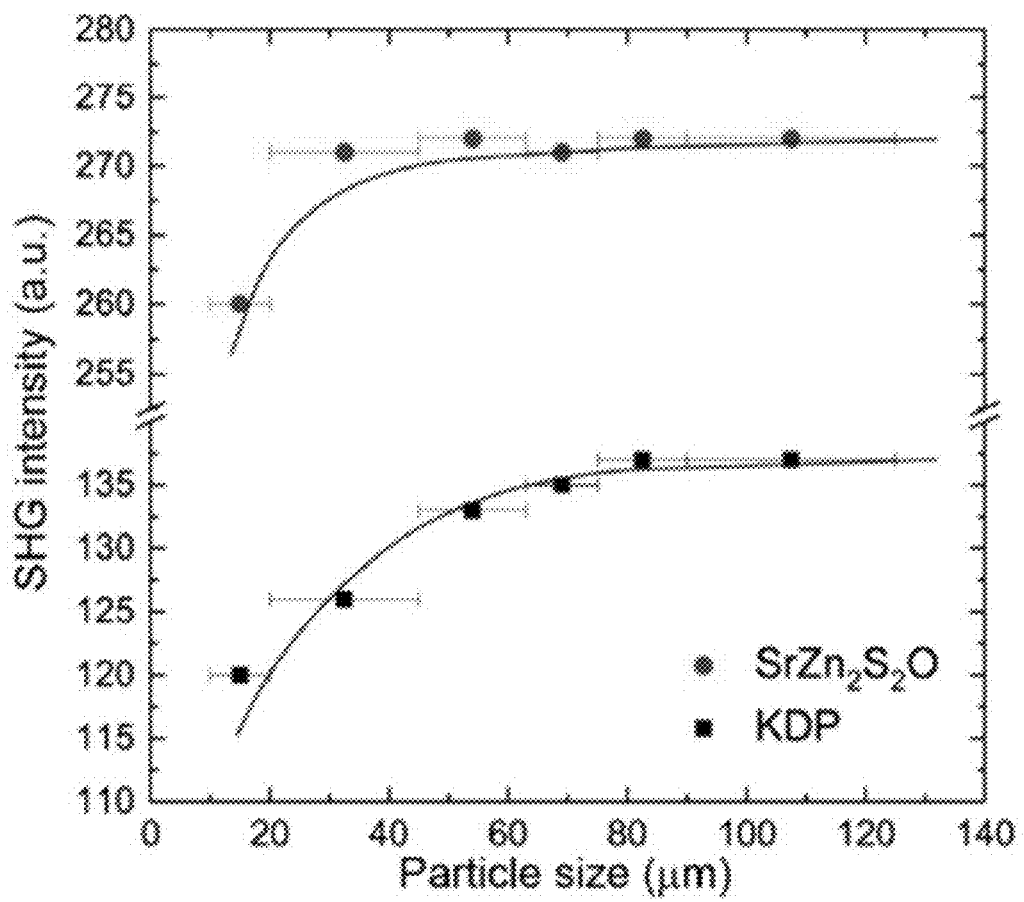
FIG. 8 shows SHG intensities of $SrZn_2S_2O$ and KDP are plotted against particle size.

Materials that crystallize in polar NCS space groups may exhibit SHG behavior, and since $SrZn_2S_2O$ crystallizes in the NCS polar space group $Pmn2_1$, powder SHG measurements with a 1064 nm laser were performed. FIG. 8 shows the SHG intensities as a function of particle size, which are compared with the known SHG intensity of KDP. The results are consistent with type-I phase-matching, as proposed by Kurtz and Perry. The SHG intensities increase with increasing particle size and reach a plateau at an SHG efficiency of approximately 2 times that of KDP. It should be noted that $SrZn_2S_2O$ is the first example of an oxysulfide material to demonstrate a phase-matching behavior, in contrast to the nonphase matching behaviors in CaZnSO and $\alpha$-$Na_3PO_4S$.

Based on the anion group theory described by Chen, dipole moments of anionic polyhedra play a crucial role in the SHG response. Therefore, to evaluate the contribution to the SHG from the asymmetric anionic groups in $SrZn_2S_2O$, the dipole moments of $[SrS_4O_2]$ and $[ZnS_3O]$ building units in the unit cell were calculated using a simple bond-valence approach proposed by Poeppelmeier. For comparison, the dipole moments in wurtzite ZnS and CaZnSO were also calculated. As detailed in Table 3, see FIG. 9, the magnitude of the dipole moments of $SrS_4O_2$, $Zn(1)S_3O$, and $Zn(2)S_3O$ building units are estimated to be 12.342, 4.375, and 3.032 D (Debye: $10^{-18}$ esu cm), respectively. Both Zn-centered tetrahedra have a dipole moment much larger than the one observed for $ZnS_4$ in wurtzite, ZnS, but somewhat smaller than the dipole moment of $ZnS_3O$ in CaZnSO. The dipole moments of $Zn(1)S_3O$ and $Zn(2)S_3O$ tetrahedra point to the S3 triangular planes, similar to what is observed for CaZnSO. Given the $mm^2$ point group for $SrZn_2S_2O$, only the z components of the dipole moments of Sr- and Zn-centered polyhedra contribute to the polarization in the unit cell. The net dipole moments along the polar c axis in the unit cell are 4.695, 2.344, and 2.609 D for $SrS_4O_2$, $Zn(1)S_3O$, and $Zn(2)S_3O$ building units, respectively. Because the net dipole moments of $Zn(1)S_3O$ and $Zn(2)S_3O$ tetrahedra are directed antiparallel to each other, the dipole moment of the $SrS_4O_2$ octahedra appears to be primarily responsible to the SHG response of $SrZn_2S_2O$.

Understanding the relationship between phase matchability and NCS structures is a challenging subject, especially for nonmolecular solids. Although $SrZn_2S_2O$ and CaZnSO possess similar chemical and electronic structures, the former is phase matching and the latter is non-phase matching. The underlying mechanism of the phase matchability in $SrZn_2S_2O$ is not understood at this point; however, the different anion order and arrangements of the polar anionic units should yield birefringence ($\Delta n$) satisfying the phase matching conditions. Recently, Lin et al. discussed the SHG properties of phasematchable $AM_3Se_6$ (A=Cs, Ba, M=Ga, In, Si, Ge, Sn) and nonphase-matchable $CsM_9Se_{12}$ (M=0.56Ga/0.44Cd) crystallizing in the polar NCS R3 space group. They suggested that $\Delta n$ is correlated with the magnitude of the dipole moments in $AM_3Se_6$, with one type of dipole moment derived from $MSe_4$. By contrast, in $CsM_9Se_{12}$, three types of dipole moments of the $MSe_4$ units are aligned along different directions resulting in small $\Delta n$ values, which are responsible for the nonphase matching behaviors. The relationship between the orientation and the magnitude of acentric building units and the phase matchability in the selenide phases does not seem to be consistent with that in the zinc oxysulfide phases. In phase matchable $SrZn_2S_2O$, the dipole moments of $SrS_4O_2$, $Zn(1)$-$S_3O$, and $Zn(2)S_3O$, which lie in the bc plane, are inclined relative to the c axis by −22°, 32°, and −59°, respectively, see FIG. 9 Table 3. The orientation preference of the building units is weaker than for those in the nonphase matchable CaZnSO, where the dipole moments of the $CaS_3O_3$ and $ZnS_3O$ units are aligned along the c direction. The difference in phase matchability between the selenide and oxysulfide phases may be related to the biaxial structure of $SrZn_2S_2O$, which cannot simply be compared with the uniaxial CaZnSO and selenide phases. Detailed future examinations of the optical properties of larger sized single crystals combined with theoretical calculations should lead to an improved understanding of the phase matchability in these oxysulfide materials.

Accordingly, single crystals of a new noncentrosymmetric polar oxysulfide $SrZn_2S_2O$ (s.g. $P_{mn}2^1$) have been grown in a eutectic KF-KCl flux. The oxysulfide has unusual wurtzite-like slabs consisting of close-packed corrugated double layers of $ZnS_3O$ tetrahedra; the slabs are vertically separated from each other by Sr atoms. These structural features are significantly different from the hexagonal AZnSO (A=Ca, Sr, Ba) which contains similar $ZnS_3O$ tetrahedra. $SrZn_2S_2O$ exhibits phase-matching behavior with SHG efficiencies twice that of KDP, which likely results from the presence of the acentric $ZnS_3O$ and $SrS_4O_2$ anionic units. This is the first realization of a phase matchable oxysulfide material. The large band gap energy of 3.86 eV and the high thermal stability up to 650° C. in an $O_2$ gas atmosphere is beneficial for practical applications. Understanding of the difference in phase matchability between $SrZn_2S_2O$ and CaZnSO will serve as a guide for the chemical design of additional functional mixed anion materials.

In a further embodiment, crystal growth was achieved via single crystals of $SrZn_2S_2O$ grown from KF/KCl eutectic molten salt. 1 mmol of SrO, 1 mmol of Zn, 1 mmol of S, 3.4 mmol of KF, and 4.1 mmol of KCl were loaded in a silver tube that had been welded on one end. The top of the tube was crimped and sealed in an evacuated silica tube under 10-4 Pa. The starting materials were heated in a tubular furnace to 900° C. at 5° C./min, held for 24 h, and cooled to 600° C. at 0.17° C./min. Then the furnace was turned off and cooled down naturally to room temperature. The product was sonicated in water and isolated via vacuum filtration. Colorless transparent plate-like crystals (typical dimension 0.1' 0.2' 0.05 mm3. See FIG. 10, which shows a photograph of a colorless transparent single crystal of $SrZn_2S_2O$, which were characterized as $SrZn_2S_2O$ by single-crystal XRD, were isolated from the filtered product containing ZnS and ZnO crystals.

Polycrystalline powder samples of $SrZn_2S_2O$ were synthesized using SrO, Zn, and S in a stoichiometric ratio. The starting materials were thoroughly mixed in an agate mortar, pressed into a pellet, and heated in an evacuated silica tube 1000° C. for 24 h. Powder XRD measurement using a Bruker D2 Phaser equipped with an LYNXEYE silicon strip detector and a Cu-Ka source identified $SrZn_2S_2O$ as the main phase and SrS as a minor phase. Additional heat treatment on the same condition did not improve the relative amount of $SrZn_2S_2O$ to SrS. Heating at higher temperatures (>1000° C.) decomposed $SrZn_2S_2O$. The pure sample was obtained by sonicating the product prepared at 1000° C. with water. SrS was easily decomposed by water and removed via vacuum filtration. The powder XRD data of $SrZn_2S_2O$ after washing is presented in FIG. 11, which shows Comparison of the powder XRD pattern of purified $SrZn_2S_2O$ with a theoretical pattern based on the single-crystal XRD analysis. A small amount of SrS was detected.

Figure 13:
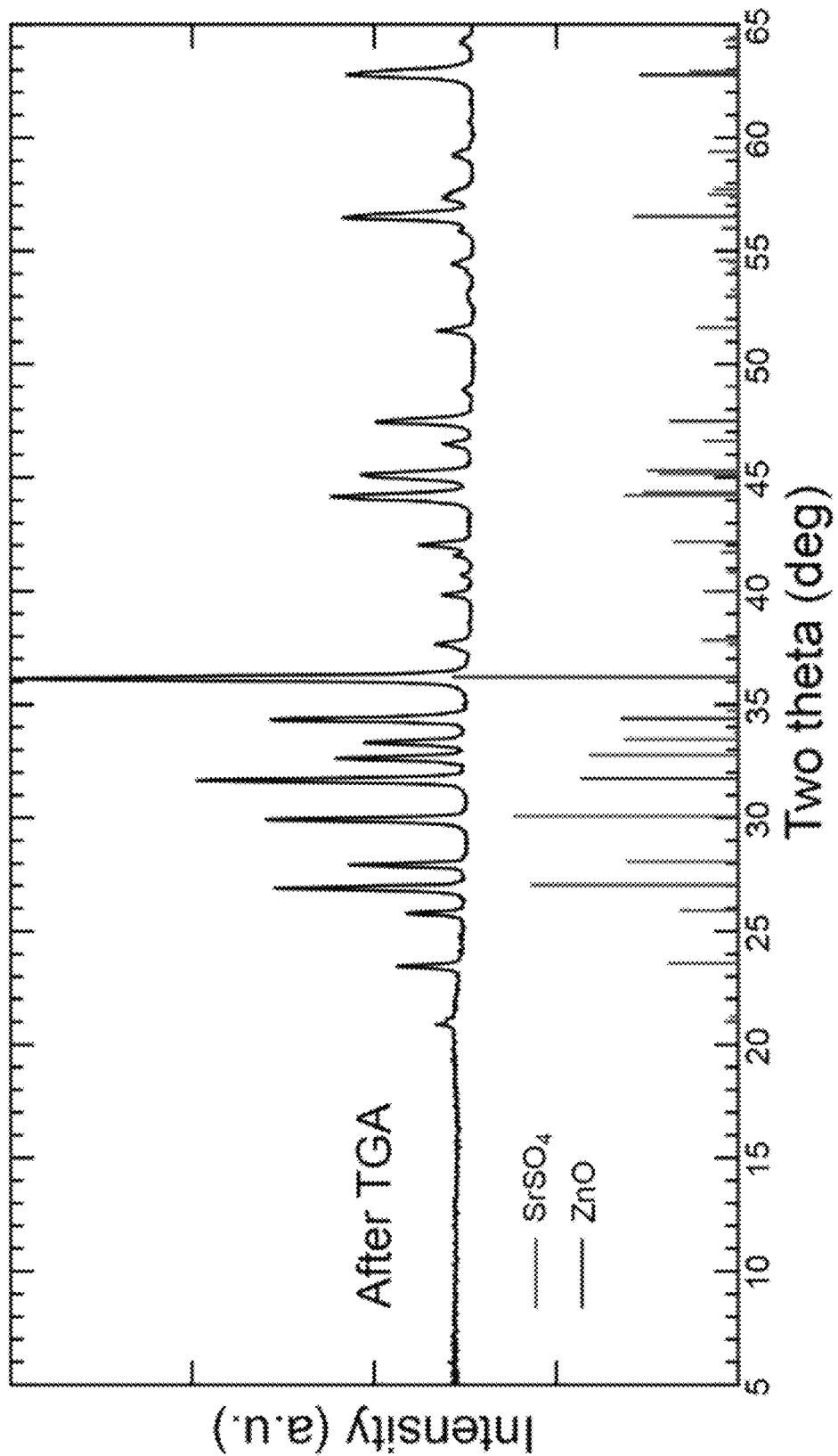
FIG. 13 shows a room-temperature XRD pattern of the products after TG measurement.
Figure 14:
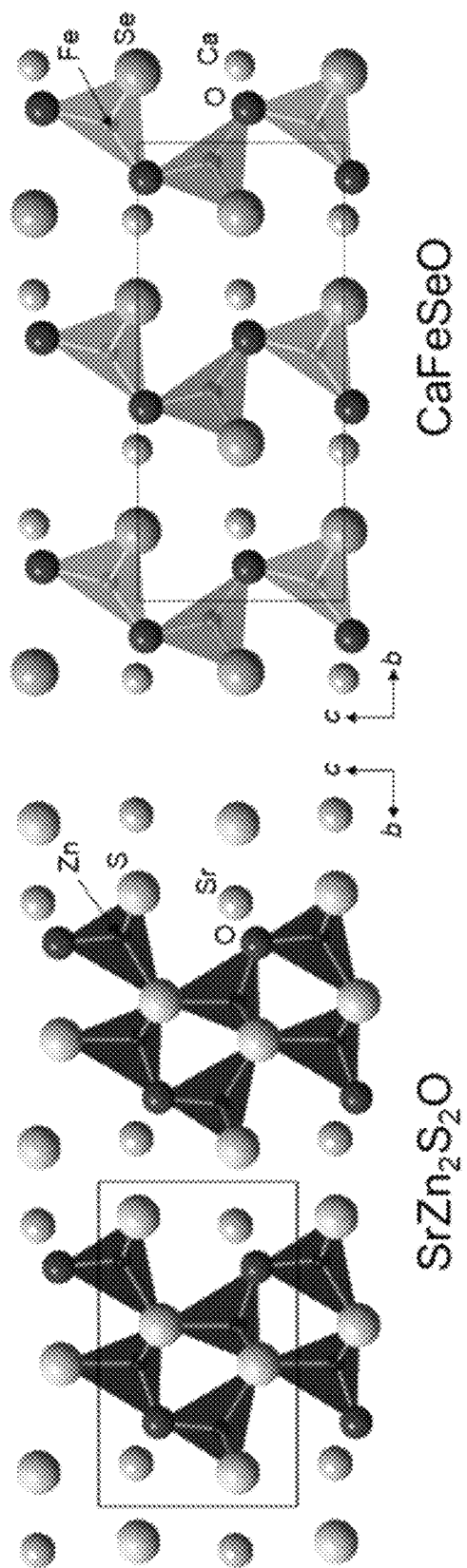
FIG. 14 shows a comparison of the crystal structure of $SrZn_2S_2O$ ($Pmn2_1$) with that of CaFeSeO ($C_{mc}2_1$).
Figure 15:
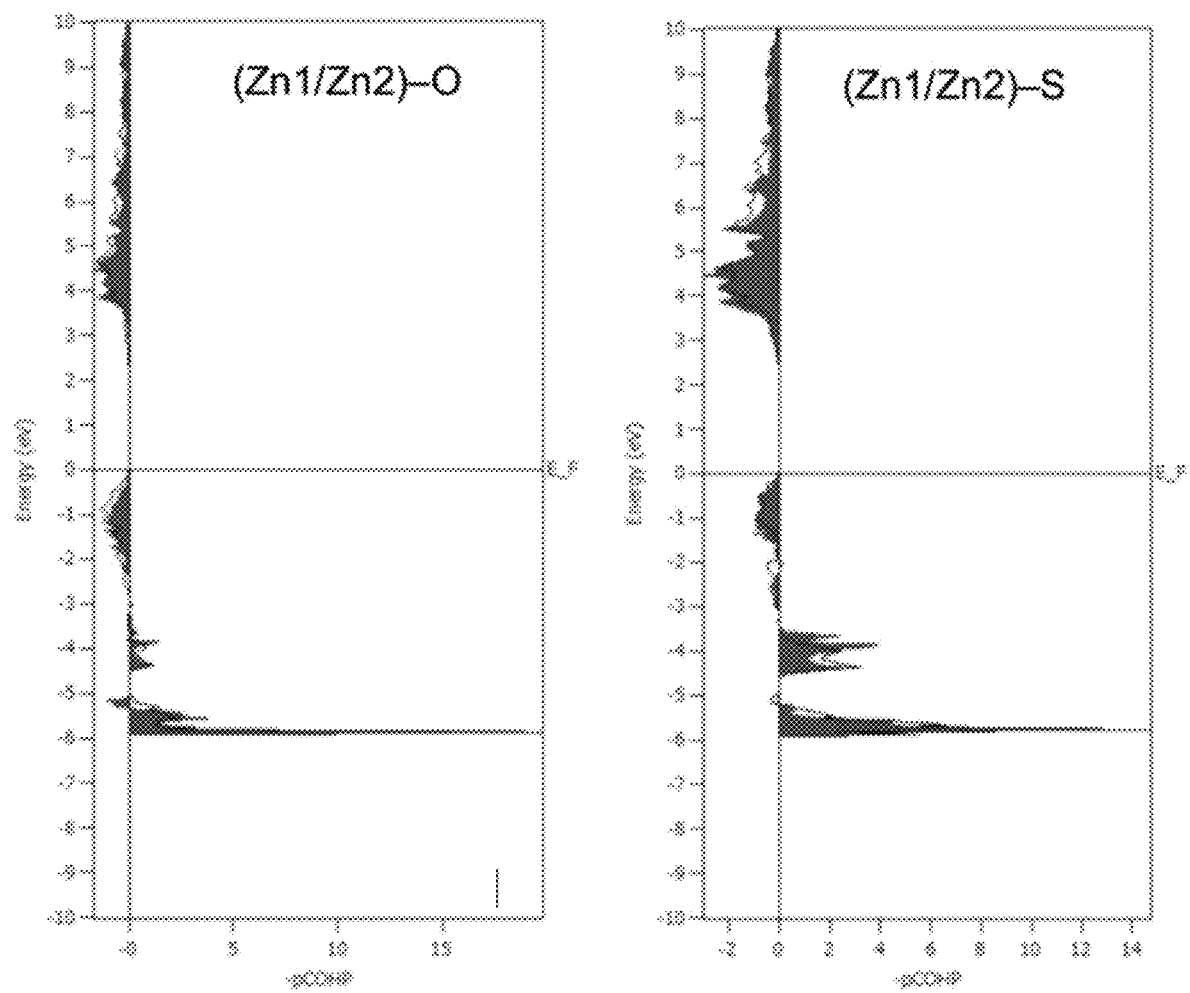
FIG. 15 shows Crystal Orbital Hamiltonian Population (COHP) for (Zn1/Zn2)-O and (Zn1/Zn2)-S interactions in $SrZn_2S_2O$.

Rietveld refinement. Synchrotron X-ray powder diffraction (SXRD) data on the purified $SrZn_2S_2O$ powder sample was collected at room temperature using a one-dimensional X-ray detector installed on BL15XU, NIMS beamline at SPring-8 in Japan. The synchrotron radiation X-rays were mono-chromatized to the wavelength of 0.65298 Å. The sample was loaded in 0.2 mm diameter glass capillary, and the diffraction data was recorded in 0.003° increments in the range of 6<2θ<50°. As presented in FIG. 12, which shows SXRD patterns for purified $SrZn_2S_2O$ measured at room temperature, the SXRD data was analyzed by Rietveld refinement using the program RIETAN-FP [1]. The refined crystallographic data are given in FIG. 19, see Table 7. With respect to the SXRD patterns for purified $SrZn_2S_2O$ measured at room temperature, obtained, calculated, and difference values are presented by cross marks (red), upper solid lines (black), and bottom solid lines (blue), respectively. The upper and lower vertical lines (green) represent the Bragg peak positions of $SrZn_2S_2O$ and SrS, respectively. SrS is present at 0.3 weight %. FIG. 13 shows room-temperature XRD pattern of the products after TG measurement, which could be assigned to ZnO and $SrSO_4$. $SrZn_2S_2O$ powder was heated in an aluminum pan up to 1000° C. in $O_2$ gas atmosphere. FIG. 14 shows a comparison of the crystal structure of $SrZn_2S_2O$ ($Pmn2_1$) with that of CaFeSeO ($Cmc2_1$). FIG. 15 shows Crystal Orbital Hamiltonian Population (COHP) for (Zn1/Zn2)-O and (Zn1/Zn2)-S interactions in $SrZn_2S_2O$. FIG. 16 shows Table 4—Atomic coordinates and equivalent isotropic displacement parameters Ueq for $SrZn_2S_2O$ at 300 K. FIG. 17 shows Table 5—Anisotropic displacement parameters Uij (102'Å2) for $SrZn_2S_2O$ at 300 K. FIG. 18 shows Table 6—Lattice constants and atomic coordinates obtained by the first principle calculations for $SrZn_2S_2O$.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for synthesizing the compound $SrZn_2S_2O$ comprising:
   loading a silver tube with 1 mmol of SrO, 1 mmol of Zn, 1 mmol of S, 3.4 mmol of KF, and 4.1 mmol of KCl;
   placing the silver tube in a silica tube that was evacuated to $10^{-4}$ Pa and sealed;
   heating the silver tube in a tube furnace to 900° C. at 5° C./min, held for 24 h, and cooled to 600° C. at 0.17° C./min;
   making a molten salt from a eutectic KF-KCl mixture, wherein SrO, Zn and S are dissolved in the eutectic KF-KCL mixture to form a flux;
   wherein the method produces $SrZn_2S_2O$ containing at least one wurtzite-like slab comprising at least one corrugated double layer of $ZnS_3O$ tetrahedra; and
   the $SrZn_2S_2O$ is a direct band gap semiconductor.

2. The method of claim 1, further comprising, extracting the compound from the flux by dissolving the flux in water followed by sonication.

3. The method for synthesizing the compound $SrZn_2S_2O$ of claim 1, wherein the at least one corrugated double layer of $ZnS_3O$ tetrahedra contains vertically separated by $Sr^{2+}$ ions wherein an O/S anion ordered arrangement provides two distinct orientations of the $ZnS_3O$ tetrahedra.

4. The method for synthesizing the compound $SrZn_2S_2O$ of claim 1, wherein the compound crystalizes in noncentrosymmetric polar space group $Pmn2_1$.

5. The method for synthesizing the compound $SrZn_2S_2O$ of claim 1, wherein the compound forms colorless, transparent crystals.

6. The method for synthesizing the compound $SrZn_2S_2O$ of claim 1, wherein the compound has a band gap of 3.86 eV.

7. The method for synthesizing the compound $SrZn_2S_2O$ of claim 1, wherein the compound is stable up to 650° C. in $O_2$ gas atmosphere.

8. The method for synthesizing the compound $SrZn_2S_2O$ of claim 1, wherein the compound is phase matchable with twice a SHG intensity of potassium dihydrogen phosphate (KDP).

9. The method for synthesizing the compound $SrZn_2S_2O$ of claim 1, wherein the compound has a Sr:Zn:S molar ratio of approximately 1.0:2.0:2.3.

10. The method for synthesizing the compound $SrZn_2S_2O$ of claim 1, wherein the compound has a band gap energy of 3.86 eV.

11. The method for synthesizing the compound $SrZn_2S_2O$ of claim 1, wherein temperatures greater than 1000° C. decompose the $SrZn_2S_2O$ compound.

* * * * *